US012567006B2

(12) United States Patent
Mahalanobish et al.

(10) Patent No.: US 12,567,006 B2
(45) Date of Patent: *Mar. 3, 2026

(54) SYSTEM AND METHOD FOR MACHINE LEARNING-BASED DELIVERY TAGGING

(71) Applicant: Walmart Apollo, LLC, Bentonville, AR (US)

(72) Inventors: Omker Mahalanobish, Kolkata (IN); Rahul Agarwal, London (GB); Nicholas William Sinai, New York, NY (US); Girish Thiruvenkadam, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/807,931

(22) Filed: Aug. 17, 2024

(65) Prior Publication Data

US 2024/0412117 A1 Dec. 12, 2024

Related U.S. Application Data

(63) Continuation of application No. 17/201,277, filed on Mar. 15, 2021, now Pat. No. 12,067,469.

(51) Int. Cl.
| | |
|---|---|
| *G06Q 30/02* | (2023.01) |
| *G06N 20/20* | (2019.01) |
| *G06Q 10/083* | (2023.01) |

(52) U.S. Cl.
CPC .......... *G06N 20/20* (2019.01); *G06Q 10/0838* (2013.01)

(58) Field of Classification Search
CPC ........................... G06N 20/20; G06Q 10/0838
See application file for complete search history.

(56) References Cited

U.S. PATENT DOCUMENTS

| | | | | |
|---|---|---|---|---|
| 8,504,485 | B1 * | 8/2013 | Wenneman | G06Q 10/083 |
| | | | | 705/338 |
| 10,242,336 | B1 * | 3/2019 | Agarwal | G06Q 10/083 |

(Continued)

OTHER PUBLICATIONS

"Boosting Algorithms for Delivery Time Prediction in Transportation Logistics" (Khiari, Juhed et al., published at the 2020 international conference on Data Mining Workshops (CDMW), DOI 10.1109/ICDMW51313.2020.00043) (Year: 2020).*

(Continued)

*Primary Examiner* — James M Detweiler
(74) *Attorney, Agent, or Firm* — DICKINSON WRIGHT RLLP; Hector A. Agdeppa

(57) ABSTRACT

A system including one or more processors; and one or more non-transitory computer-readable media storing computing instructions, that when executed on one or more processors, cause the one or more processors to perform certain operations including: training a first submodel of a machine learning model by at least (i) creating a cumulative addition of light gradient boosting models, and (ii) determining weights for aggregation with probabilities from the light gradient boosting models; generating, using the machine learning model, as trained, classifications for nodes, wherein the classifications comprise unions of outputs of the first submodel of the machine learning model and outputs of a second submodel of the machine learning model; and based on the classifications for the nodes, automatically tagging a portion of the nodes as deliverable in an online platform. Other embodiments are described.

20 Claims, 7 Drawing Sheets

(56)         References Cited

U.S. PATENT DOCUMENTS

| | | | | |
|---|---|---|---|---|
| 10,318,569 | B1 | 6/2019 | Funk et al. | |
| 10,460,332 | B1 * | 10/2019 | Kujat ................. | G06Q 30/0202 |
| 11,507,820 | B1 * | 11/2022 | Varrichio ............. | G06N 3/0464 |
| 2006/0224398 | A1 * | 10/2006 | Lakshman ......... | G06Q 10/0833 |
| | | | | 705/333 |
| 2013/0144800 | A1 | 6/2013 | Fallows | |
| 2014/0330741 | A1 * | 11/2014 | Bialynicka-Birula ....................... | |
| | | | | G06Q 10/0838 |
| | | | | 705/341 |
| 2017/0255903 | A1 | 9/2017 | Chowdhry et al. | |
| 2017/0278062 | A1 * | 9/2017 | Mueller ............. | G06Q 30/0631 |
| 2020/0118071 | A1 | 4/2020 | Venkatesan et al. | |
| 2022/0138817 | A1 * | 5/2022 | Benkreira .......... | G06Q 30/0609 |
| | | | | 705/26.35 |

OTHER PUBLICATIONS

"Boosting Algorithms for Delivery Time Prediction in Transportation Logistics" (Khiari, Juhed et al., published at the 2020 International Conference on data Mining Workshops (CDMW), DOI 10.1109/ICDMW51313.2020.00043) 2020.

* cited by examiner

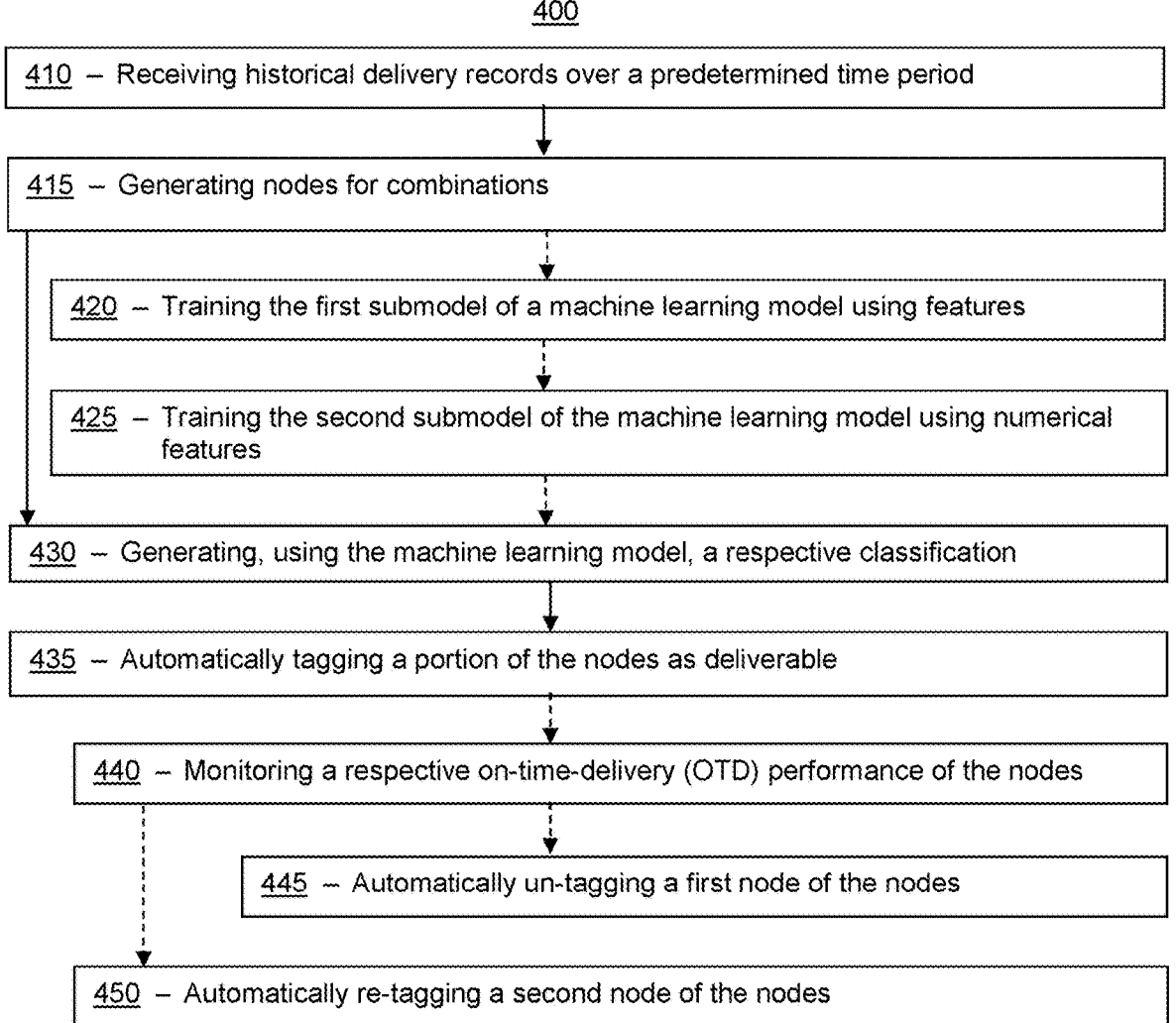

400

410 – Receiving historical delivery records over a predetermined time period

415 – Generating nodes for combinations

420 – Training the first submodel of a machine learning model using features

425 – Training the second submodel of the machine learning model using numerical features 430 – Generating, using the machine learning model, a respective classification 435 – Automatically tagging a portion of the nodes as deliverable 440 – Monitoring a respective on-time-delivery (OTD) performance of the nodes 445 – Automatically un-tagging a first node of the nodes 450 – Automatically re-tagging a second node of the nodes

FIG. 4

SYSTEM AND METHOD FOR MACHINE LEARNING-BASED DELIVERY TAGGING

CROSS-REFERENCE TO RELATED APPLICATIONS

The present application is a Continuation Application of U.S. patent application Ser. No. 17/201,277, filed on Mar. 15, 2021, which is herewith incorporated by reference in its entirety.

TECHNICAL FIELD

This disclosure generally relates to machine learning-based delivery tagging of items.

BACKGROUND

When items are presented to users online, the users often want to know how soon the item can be delivered to the user. If an item is listed as having a 5-day delivery time window, some users may decide to not checkout the item, as they prefer a shorter wait time. Some of these items listed as having a 5-day delivery time window may likely be delivered to certain regions in a 2-day delivery time window, but users in those regions are generally unaware that the item would likely be delivered within a 2-day delivery time window, and thus may decide to not checkout the item.

BRIEF DESCRIPTION OF THE DRAWINGS

To facilitate further description of the embodiments, the following drawings are provided in which:

FIG. 4 illustrates a flow chart for a method, according to another embodiment;

Figure 1:
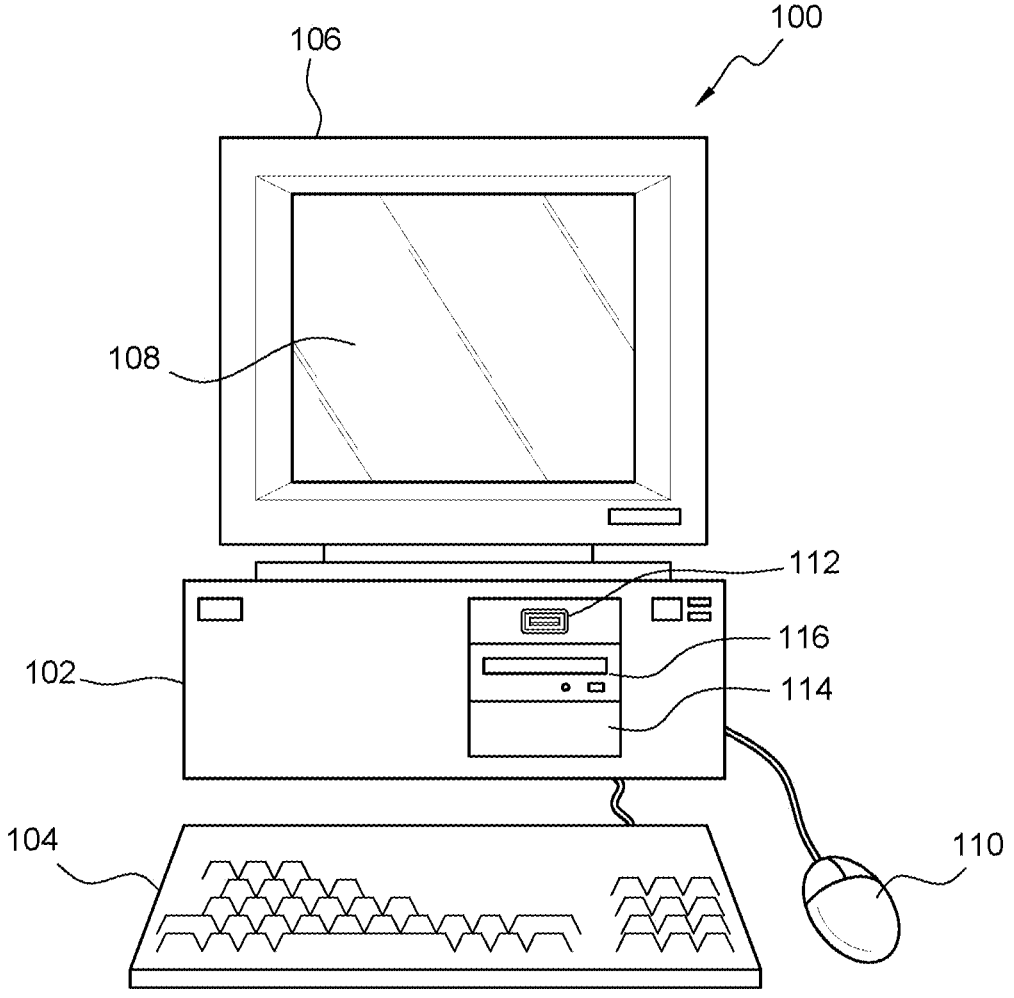
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than 1 second, 1 minute, or another suitable time delay period

DESCRIPTION OF EMBODIMENTS

Figure 2:
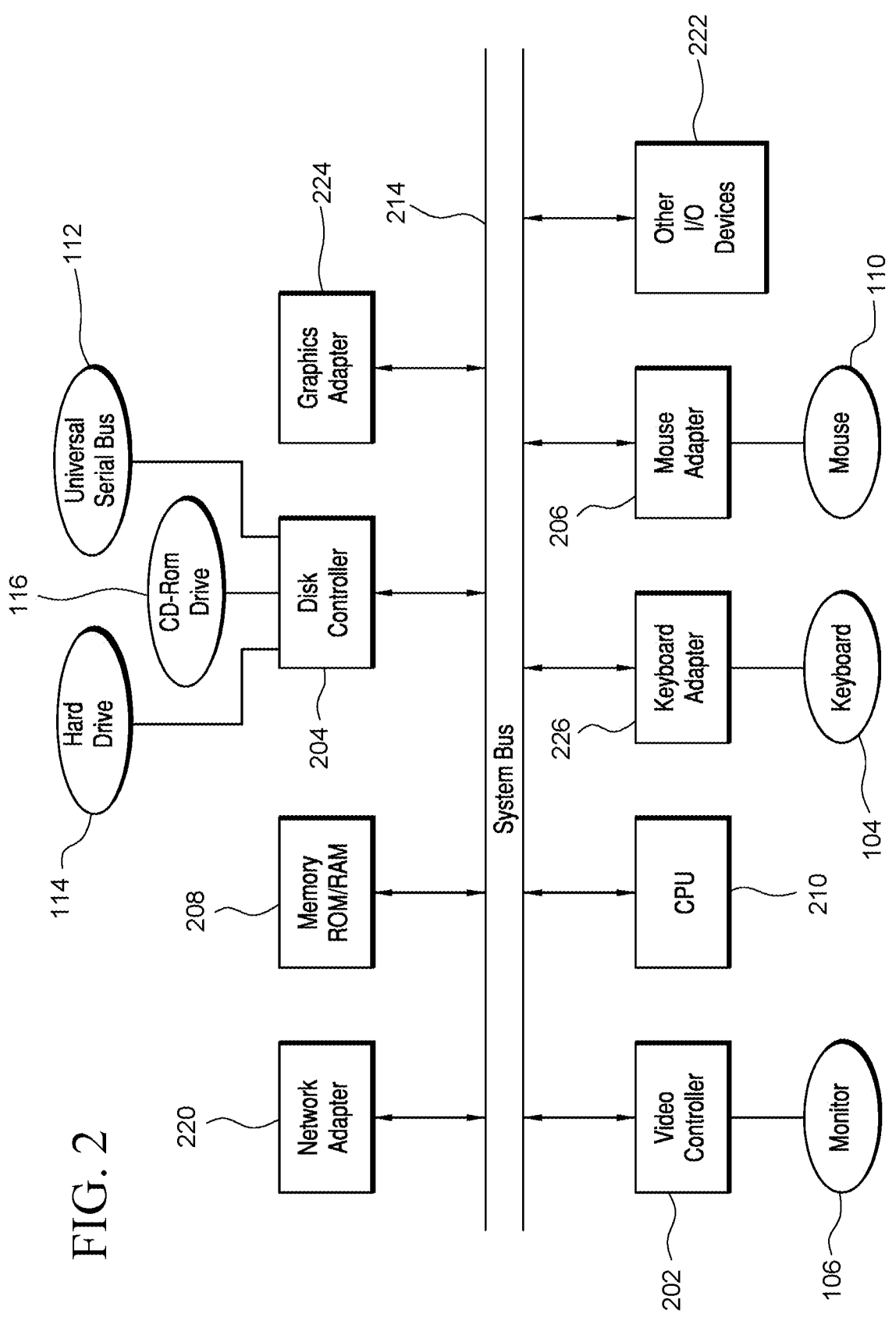
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
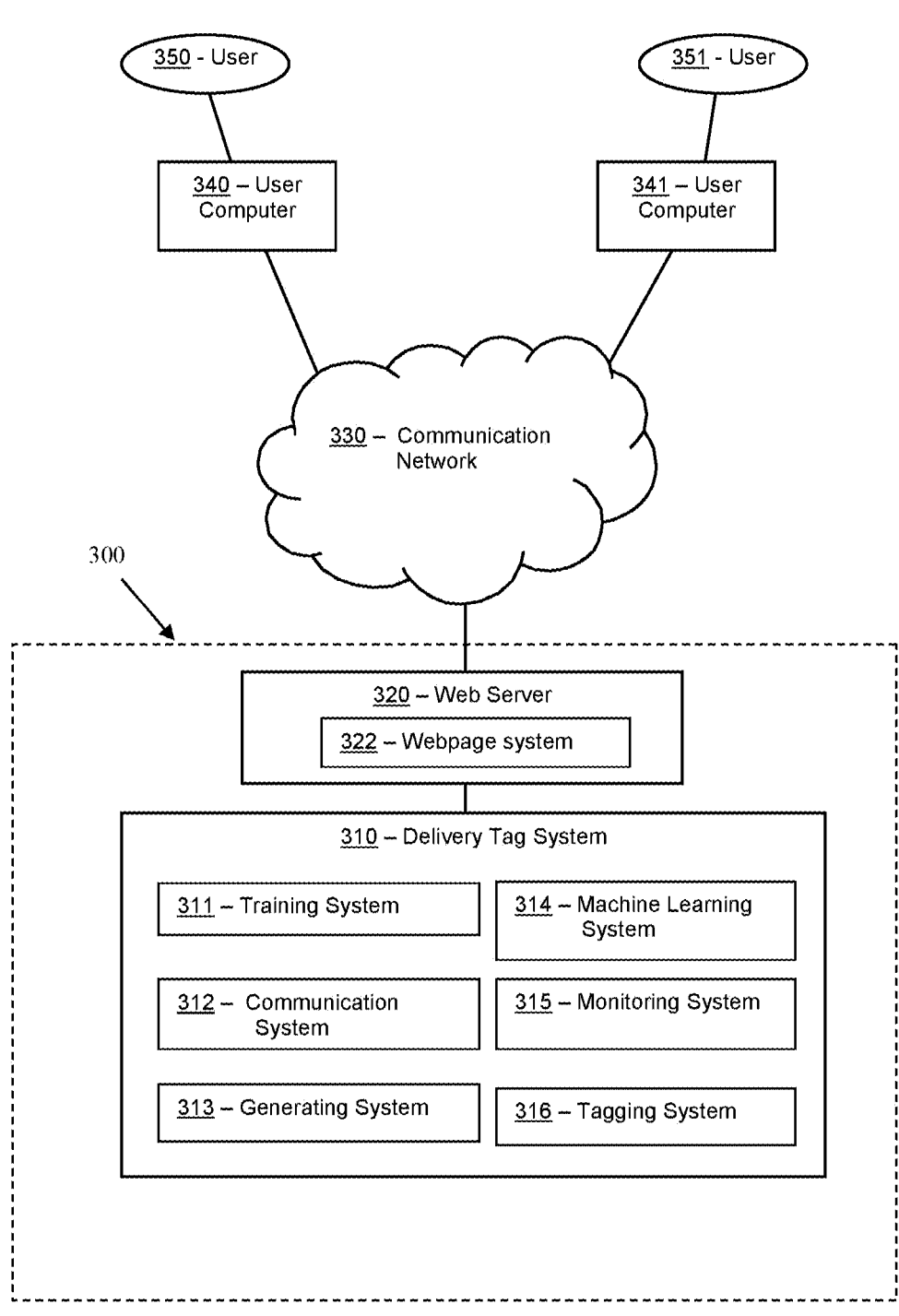
FIG. 3 illustrates a block diagram of a system that can be employed for machine learning-based delivery tagging of a node, according to an embodiment.

Turning ahead in the drawings, FIG. 3 illustrates a block diagram of a system 300 that can be employed for automatically tagging an item in an online platform as deliverable within a time window. System 300 can also be employed for automatically un-tagging and/or re-tagging an item in the online platform as deliverable within the time window. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a delivery tag system 310 and/or a web server 320. Delivery tag system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, delivery tag system 310 and/or web server 320. Additional details regarding delivery tag system 310 and/or web server 320 are described herein.

In a number of embodiments, delivery tag system 310 can be a special-purpose computer programed specifically to perform specific functions not associated with a general-purpose computer, as described in greater detail below. In other embodiments, delivery tag system 310 can be a general-purpose computer.

In some embodiments, delivery tag system 310 and/or web server 320 can be in data communication through a communication network 330 with one or more user computers, such as user computers 340 and/or 341. Communication network 330 can be a public network, a private network or a hybrid network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between delivery tag system 310 and/or web server 320 within system 300. Accordingly, in some embodiments, delivery tag system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

In some embodiments, communication network 330 can be an internal network that is not open to the public, which can be used for communications between delivery tag system 310 and/or web server 320. In other embodiments, communication network 330 can be a public network, such as the Internet. In several embodiments, operators and/or administrators of system 300 can manage system 300, the processor(s) of system 300, and/or the memory storage unit(s) of system 300 using the input device(s) and/or display device(s) of system 300, or portions thereof in each case.

In several embodiments, delivery tag system 310 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to delivery tag system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of delivery tag system 310. In a similar manner, the processors and/or the non-transitory computer-readable media can be local and/or remote to each other.

Meanwhile, in many embodiments delivery tag system 310 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between delivery tag system 310, web server 320, and/or the one or more databases can be implemented using any suitable manner of wired and/or wireless communication. Accordingly, delivery tag system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, delivery tag system 310 can include a training system 311, a communication system 312, a generating system 313, a machine learning system 314, a monitoring system 315, and/or a tagging system 316. In many embodiments, the systems of delivery tag system 310 can be modules of computing instructions (e.g., software modules) stored at non-transitory computer readable media that operate on one or more processors. In other embodiments, the systems of delivery tag system 310 can be implemented in hardware.

Figure 5:
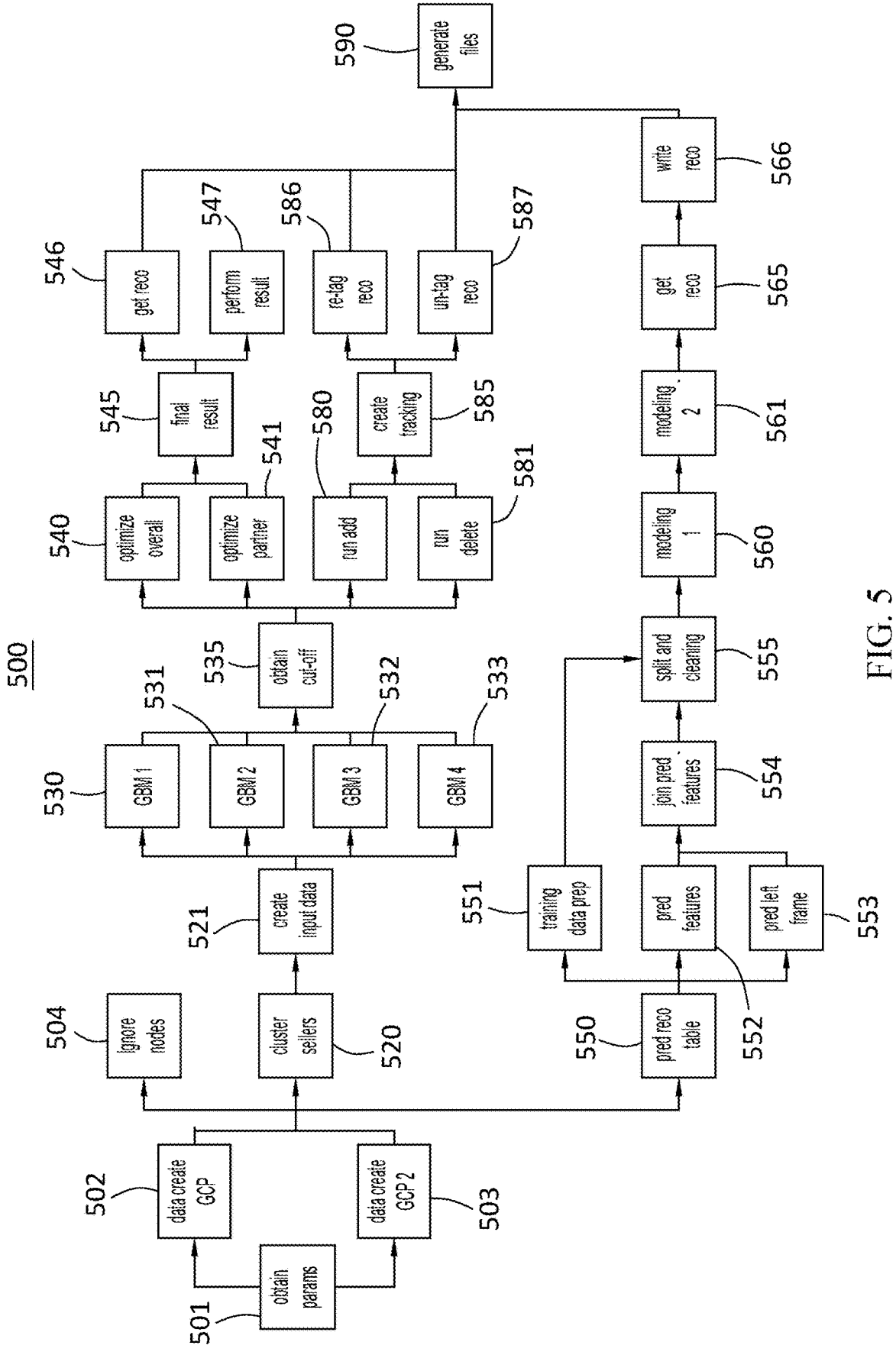
FIG. 5 illustrates a flow chart of a method, according to an embodiment.

Jumping ahead in the drawings, FIG. 5 illustrates a flow chart for a method 500 of automatically generating a probability score for each partner-item-subregion node on whether to classify the node as deliverable within a predetermined time window using an online platform, according to an embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In many embodiments, method 500 can be implemented by delivery tag system 310 (FIG. 3).

In various embodiments, method 500 can involve a machine learning-based delivery tagging model that can generate a list of partner-item-subregion nodes that can be tagged as deliverable over a time window. The terms machine learning-based delivery tagging model, a machine learning-based delivery tagging framework, a platform model, and/or a model are used interchangeably. In some embodiments, items can be deliverable over a time window, such as a one-day deliverable option, a two-day deliverable option, and/or another suitable deliverable time window. In many embodiments, a node can represent a single unit for on-time-deliveries (OTD) from various marketplace sellers (e.g., sellers using an online sales platform) in a subregion of a region of the United States. For example, the United States can be divided into many regions and each region can be divided into subregions, such as 141 subregions. Such a node can include a combination of a partner, an item, and a subregion. In many embodiments, the system can track respective OTD metrics for each item associated with a corresponding node. The terms partner, vendor, and seller are used interchangeably.

In some embodiments, method 500 can generate a classification for each node on the list of nodes, using a machine learning model, based on historical delivery records. In many embodiments, the machine learning model includes two main submodels using two different machine learning approaches: a first submodel using a light gradient boosted machine (LightGBM) model approach and a second submodel using a CatBoost algorithm based approach. In several embodiments, generating a probability score for each node can be performed using each of the two different machine learning approaches. In some approaches, each probability score can be further classified into binary classification based on identified predetermined thresholds for each approach. For example, nodes which exceed a predetermined threshold can be classified as a deliverable within a 2-day delivery time window. Further in the example, nodes tagged with a 2-day deliverable option can be selected and written into a series of CSV (comma-separated values) files corresponding to a pre-specified template to facilitate ingestion of down-stream processing.

In several embodiments, method 500 can include an integrated workflow process to determine whether or not an item corresponding to a node can be automatically tagged with a delivery time window for a period of time. For example, a node displayed on an online platform (e.g., a website) can be tagged with a two-day delivery option for the user to select. Once the node is tagged with a delivery window option, method 500 can evaluate a node presently tagged with the delivery window option on whether to remove (e.g., un-tag) the delivery window option. In following with the previous example, the delivery option can be untagged from the item removing the delivery option. Upon un-tagging the item with the delivery option, method 500 can evaluate and/or re-evaluate the item on whether to re-tag the item by adding back the delivery window option. In some embodiments, a workflow process can be a feature of a machine learning platform that can automate user defined sequential executions of numerous parametric scripts. The numerous parametric scripts can include different sets of values of parameters. In several embodiments, the workflow process also can be deployed and/or executed as a scheduled job.

In various embodiments, the integrated workflow process can determine to automatically tag a first node (e.g., partner A-item A-subregion A) with a delivery window and a second node (e.g., partner A-item A-subregion B) without a delivery window. For example, each node for a partner-item can receive different classifications for delivery time windows for different subregions based on current delivery performance metrics for each subregion. For example, two nodes corresponding to the same item for delivery in two different regions can be tagged differently. In one scenario, node A can be classified as a deliverable for a 2-day delivery where in a second scenario, node B for the same item can be classified as not a deliverable for the 2-day delivery in subregion B.

In many embodiments, the parameters of the workflow process additionally can include (i) a date, (ii) top n sellers, (iii) pilot sellers, (iv) other additional sellers, (v) run on sample, (vi) write to database, (vii) perform clustering and/or another suitable workflow parameter. The date parameter can be the date at which data can to be considered as part of the test data period. The "top n sellers" parameter can be the number of sellers to be selected from an ordered list of sellers using a hierarchical order from highest performing sellers to lower performing sellers. The "pilot sellers" parameter can be a known list of pilot sellers as of a particular date. The "other additional sellers" parameter can be a group of other sellers other than the top n sellers. The "run on sample" parameter can indicate whether to run a CatBoost model on a sample of data (e.g., a single seller), or the full data (e.g., all the sellers). The "write to database" parameter can indicate whether to write the results to a production database or not at a given time period. The "perform clustering" parameter can indicate whether to run the clustering algorithm to cluster the sellers or not at a given time period.

In various embodiments, generating recommendations (e.g., classifications) can be a process in which many scripts can run in parallel and other scripts can be run sequentially. In some embodiments, method 500 can run the whole workflow process from end-to-end and generate recommendations at a pre-defined cadence, such as every few days, twice a month, and/or another suitable cadence.

In some embodiments, the workflow process can be divided into multiple parts or processes. In several embodiments, each such part or process can be associated with one or more sources of data as input and each part or process can produce one or more similar outputs and/or one or more different outputs.

In various embodiments, scheduling the workflow process can occur at a predetermined time interval such twice a week, twice a month, and/or another suitable time interval. For example, the workflow process can be scheduled to run on the 3rd and the 17th of every month. In several embodiments, running each of the workflow processes can involve different amounts of time to complete each workflow depending on an amount of data received for a particular seller, a particular item, and/or a particular subregion. In one example, the time period can involve an average runtime of approximately 8 to 9 hours to complete a process. For example, a particular seller can include a large retail seller or a seller of one item. As another example, a particular item can be a high selling item with a lot of data records or a low selling item with little data over a period of time. As another example, a particular subregion could be small rural area or a large metropolis city.

In several embodiments, method 500 can include a block 501 of data preparation, which can include obtaining parameters. The data can include historical data for an item, a seller, and a region including item data, seller data, regional data, delivery data, and/or another suitable data point. In some embodiments, delivery data can include metrics for (i) OTD of each item corresponding to a respective node where the item was delivered on or before the promised delivery time window and (ii) each missed OTD event for the item. In various embodiments, the OTD metrics can be measured as a ratio and/or a percentage of OTDs based on the predetermined period of time of the data as received. In some embodiments, the data can extend over a predetermined period of time, such as 6 months, 8 months, and/or another suitable period of time.

In various embodiments, the predetermined period of time can be divided into two or more periods of times. In several embodiments, method 500 can proceed after block 501 to a block 502 and a block 503. In some embodiments, block 502 can include creating the data for a 3-month period starting 6 months prior to a current day of the predetermined time period. In various embodiments, block 503 can include creating the data for the latest 3-month period of the 6 months. The time period of block 502 is referred to as period 1 and the time period for block 503 is referred to as period 2.

In some embodiments, the machine learning-based delivery tagging framework can include multiple features. In various embodiments, such multiple features can be derived from block 502 (e.g., for period 1) and can be merged with a corresponding or associated response variable from block 503 (e.g., for period 2). In several embodiments, the multiple features can be similar or identical to the features listed in connection with Table 1, as shown below. In various embodiments, any order of the item belonging to a group (e.g., a node), such as Seller A, Item 001, SubRegion AB1, the response variable for the group, as it occurred in period 2, can be merged with the corresponding features from orders belonging to the same group in period 1. The terms group and node are used interchangeably.

In several embodiments, an advantage of merging data from block 502 and block 503, can make the framework model more robust to newer groups in a holdout sample. In some embodiments, merging the data can lose an estimated 17% of the data due to orders in period 2 belonging to groups that were not observed in period 1. In various embodiments, while the estimated 17% data can be discarded in order to remove bias from the model, discarding the estimated 17% data could in turn lead to a framework model that could not perform for an unseen set of predictors. For example, for the estimated 17% data, the platform can use all the other features, apart from the group-level features, and impute the unknown group level features by 0, thus indicating that features pertaining to these groups have not been observed. Imputing by 0 in this case can be justified as 0 lies in the range of each of the features and could mean an absence of orders in the group, as in this particular case example. Such an exemplary scenario can illustrate how to make the platform model robust to newer groups in the holdout sample.

In various embodiments, such features can include some or all of the following features listed in Table 1.

TABLE 1

| Features | | |
| --- | --- | --- |
| Feature Name | Description | Transformation |
| Prtnr_id | A partner identification (ID) | Categorical |
| Num_orders | A number of total orders received in the seller-item-subregion group | Considered as Weights |
| Avg_gmv_plcd_amt | An average GMV of in the seller-item-subregion group, where GMV refers to a gross merchandise value. | Standardized |
| Avg_net_sales_plcd_amt | An average net sales placed amount in the seller-item-subregion group | Standardized |
| Avg_item_price_amt | An average price of the item | Standardized |
| Avg_shpmnt_qty | An average number of shipments in the seller-item-subregion group | Standardized |
| Pkg_wt_oz_qty | An average weight of a package for order of the item | Standardized |
| GTIN | A GTIN of the item refers to a Global Trade Item Number | Categorical |
| Rpt_lvl_0_nm | L0 of the item hierarchy | One-Hot encoded |
| Rpt_lvl_1_nm | L1 of the item hierarchy | One-Hot encoded |
| Rpt_lvl_2_nm | L2 of the item hierarchy | Categorical |
| Rpt_lvl_3_nm | L3 of the item hierarchy | Categorical |
| Rpt_lvl_4_nm | L4 of the item hierarchy | Categorical |
| State | A state refers to the United States | One-Hot encoded |
| Region_name | A region refers to regions of the United States. | One-Hot encoded |
| Sub_region_id | A sub region refers to subregions of the regions of the United States | Categorical |
| wh_flag | A number 1 can be used to indicate whether the seller was historically observed to have a first scan in a State under consideration | Categorical |
| seller_effi | Average time taken in hours for a seller to ship the item post order placement, historically | Standardized |

TABLE 1-continued

| | Features | |
|---|---|---|
| Feature Name | Description | Transformation |
| dhl | A fraction of non-express and non-two day tagged historical orders shipped by the seller through DHL courier | Standardized |
| fedex_smartpost | A fraction of non-express and non-two day tagged historical orders shipped by the seller through Fedex Smartpost courier | Standardized |
| fedex | A fraction of non-express and non-two day tagged historical orders shipped by the seller through Fedex courier | Standardized |
| lasership | A fraction of non-express and non-two day tagged historical orders shipped by the seller through Lasership courier | Standardized |
| ontrac | A fraction of non-express and non-two day tagged historical orders shipped by the seller through OnTrac courier | Standardized |
| ups | A fraction of non-express and non-two day tagged historical orders shipped by the seller through UPS courier | Standardized |
| ups_mail_innovations | A fraction of non-express and non-two day tagged historical orders shipped by the seller through UPS Mail Innovations courier | Standardized |
| usps | A fraction of non-express and non-two day tagged historical orders shipped by the seller through USPS courier | Standardized |
| seller success | A historical two-day delivery success rate of the Seller | Standardized |
| item success | A historical two-day delivery success rate of items in corresponding Rpt_lvl_4_nm | Standardized |
| region success | A historical two-day delivery success rate of orders in the sub region | Standardized |
| group success | A historical two day delivery success rate of the seller-item-subregion group | Standardized |
| 2 day flag | A target variable denoting the historical proportion of non express and non two day tagged orders being delivered successfully within two days | Response Variable |

In a number of embodiments, a 2-day model framework can be used to predict a number of days that it will take to deliver an order purchased using a marketplace platform sold by multiple marketplace sellers. In some embodiments, the model can run twice a month looking back into 6 months of data. In various embodiments, the 6 months of data can be randomly divided into training data, validation data, and/or holdout data. For example, the 6 month data can be randomly divided as such: training data (60%), validation data (20%), and holdout data (20%). In several embodiments, final data for the platform model can be obtained using lagged features.

In some embodiments, the training data can be the data used for training the platform model, whereas the validation data can be the data used to evaluate the platform model. In several embodiments, the platform model can continue to be tuned until the model performance based on a set of the validation data exceeds a predetermined threshold indicating a level of increased (e.g., improved) performance. In various embodiments, when the platform model is implemented, evaluating the platform model can be conducted by testing performance (e.g., delivery performance) using the holdout sample.

In a number of embodiments, method 500 can include a block 504 of separating a set of nodes not used (e.g., ignored) as part of the data over the time period.

In several embodiments, method 500 can include a first submodel of the machine learning model that can determine, at an overall level (e.g., all nodes), an overall probability score on whether to tag an item corresponding to one or more nodes as deliverable within a predetermined time window. In FIG. 5, the first submodel is shown in blocks 520-521, 530-535, 540-541, and 545-547. In various embodiments, each overall probability score can be part of a union of percentages used as part of the union to determine the probability score for the item associated with all of the nodes.

In some embodiments, method 500 can include a block 520 of clustering all of the partners or sellers that sell the item over an online platform. In various embodiments, partners can offer items for sale over a marketplace platform along with a retailer on one or more online platforms.

In a number of embodiments, clustering the partners or sellers that sell the item over the online platform can include clustering (e.g., grouping) similar sellers together into mutually exclusive and exhaustive groups, such that sellers belonging to a same group are homogeneous in nature and exhibit similar activities or patterns on the online platform, which is different when compared to the sellers in a different group (or cluster). In many embodiments, an advantage to clustering the partners or sellers can provide a seamless implementation of the models for each prediction scenario by allowing each seller that does not exceed a threshold of orders to generate recommendations based on the features of other similar sellers grouped in the same cluster.

In some embodiments, method 500 also can include a block 521 of creating input data from the one or more clusters of partners of block 520. In various embodiments, the input data 521 can be used as input for one or more light gradient boosting model classification models (LightGBM)

that uses a Gradient Boosted Tree. For example, or every input row, the LightGBM outputs a probability of the item associated with a node (e.g., Seller-Item-SubRegion) to be tagged with a delivery date option, such as a 2-day deliverable. In such an example, the output of the LightGBM can be a probability score or a percentage.

In several embodiments, training the first submodel of the machine learning model can use features. In some embodiments, the features can be classified as:

(i) partner features which can include: prtnr_id, wh_flag, seller_effi, dhl, fedex_smartpost, fedex, lasership, ontrac, ups, ups_mail_innovations, usps, seller_success, as described in connection with Table 1 above;

(ii) item features, which can include pkg_wt_oz_qty, GTIN, rpt_lvl_0_nm, rpt_lvl_1_nm, rpt_lvl_2_nm, rpt_lvl_3_nm, rpt_lvl_4_nm, item_success, as described in connection with Table 1 above;

(iii) region features, which can include state, region_name, sub_region_id, region_success, as described in connection with Table 1 above; and/or (iv) group features, which can include avg_gmv_plcd_amt, avg_net_sales_plcd_amt, avg_item_price_amt, avg_shpmnt_qty, group_success, as described in connection with Table 1 above.

In various embodiments, a series of 4 LightGBM (Light Gradient Boosting Machine) models can be trained, each with a different set of a pre-defined set of features. In several embodiments, the model can be fitted using full data (e.g., overall data) including all of the partners or sellers.

In some embodiments, generating multiple LightGBM models can include using a cumulative addition of the features. In several embodiments, method 500 also can include a cumulative addition of LightGBM models such as a block 530 of performing a first LightGBM, referred to as GBM_1, a block 531 of performing a second LightGBM, referred to as GBM_2, a block 532 of performing a third LightGBM, referred to as GBM_3, a block 533 of performing a fourth LightGBM, referred to as GBM_4. Such multiple LightGBM models can be based on cumulative additions of features from the previous LightGBM models, as follows:

GBM_1: trains from scratch on the partner features;

GBM_2: starts to train from GBM_1, with both the partner features and the item features;

GBM_3: starts to train from GBM_2, with the partner features, the item features and the region features; and GBM_4: starts to train from GBM_3, with all of the partner features, the item features, the region features and the group features.

In various embodiments, the series of 4 LightGBM models, as trained, can each have separate outputs. For example, each output of each LightGBM model can include a respective probability score that can be used as input to the next LightGBM model. In some embodiments, the outputs of the LightGBM models can be aggregated using Bayesian Model Combination.

In several embodiments, method 500 additionally can include a block 535 of obtaining a cut-off of the aggregated GBM models. In some embodiments, the cut-off of block 535 can be processed further in a block 540 of optimizing the full data or overall data and in a block 541 of optimizing each partner or seller using the per-seller data for the item. In various embodiments, each of the LightGBM models can be optimized for loss functions, such as to reduce binary log loss, to improve precision scores, and/or to improve recall scores. In several embodiments, reducing binary log loss for each GBM can be performed using a binary log loss function, such as a conventional binary log loss cost function. In some embodiments, the lower the binary log loss the higher the optimization of the GBM model. In some embodiments, improving precision scores can be performed using an average precision function. Such an average precision function can summarize a precision-recall curve as the weighted mean of precisions achieved at each threshold, with the increase in recall from a previous threshold used as the weight, as described in Equation 1:

$$AP = \sum\nolimits_n (R_n - R_{n-1})P_n \qquad \text{Equation 1}$$

where AP refers to an average precision, n refers to a threshold, $R_n$ refers to the recall at the nth threshold and $P_n$ refers to the precision at the nth threshold.

In many embodiments, the higher the average precision of each GBM model, the higher the optimization. In various embodiments, improving recall scores can include obtaining a recall at 95% (e.g., a recall at 95% precision). In some embodiments, the higher the recall the higher the optimization of the LightGBM model. In several embodiments, reducing binary log loss for each LightGBM can begin with first training each LightGBM tree so as to reduce the binary log loss, then training each LightGBM again to improve the precision and the recall scores.

As an example, recall at 95% precision can be explained using the precision at the nth threshold and the recall at the nth threshold described in the average precision function in Equation 1. Consider the following scenario of an exemplary classification process for 10 identifiers, illustrated in Table 2, as follows:

TABLE 2

| ID | True Classification | Predicted Probability | Predicted Classification at threshold = 0.3 | Predicted Classification at threshold = 0.5 | Predicted Classification at threshold = 0.7 |
|---|---|---|---|---|---|
| ID-01 | 1 | 0.80 | 1 | 1 | 1 |
| ID-02 | 1 | 0.75 | 1 | 1 | 1 |
| ID-03 | 1 | 0.65 | 1 | 1 | 0 |
| ID-04 | 0 | 0.30 | 0 | 0 | 0 |
| ID-05 | 0 | 0.20 | 0 | 0 | 0 |
| ID-06 | 1 | 0.55 | 1 | 1 | 0 |
| ID-07 | 0 | 0.85 | 1 | 1 | 1 |
| ID-08 | 0 | 0.35 | 1 | 0 | 0 |
| ID-09 | 1 | 0.15 | 0 | 0 | 0 |
| ID-10 | 1 | 0.95 | 1 | 1 | 1 |

Going by the precision at the nth threshold and the recall at the nth threshold, calculating the recall at 95% can be described in Table 3, as follows:

TABLE 3

| Threshold | Precision at threshold | Recall at threshold |
|---|---|---|
| 0.3 | 5/7 | 5/6 |
| 0.5 | 5/6 | 5/6 |
| 0.7 | 3/4 | 3/6 |

In some embodiments, the system can calculate the precision and recall for all such possible thresholds by getting the predicted probabilities such that the recall corresponds to a threshold, where the precision is at least 95%, is maximized.

In some embodiments, block 535 of obtaining a cut-off of the aggregated GBM models also can include determining weights to assign to each GBM model can be estimated using a Bayesian approach. For example, delivery metrics can include delivering 1 out of 1 orders, 2 of 2 orders and even 3 out of 3 orders in two days, can add up to a 100% success rate as compared to delivering 9 out of 10 orders within two days, which can include a 90% success rate. In following the example, such a scenario can be a paradox, such as in this example, the node (e.g. the seller-item-subregion) with 9 out of 10 success (e.g., a 90% success rate) can actually be a more promising scenario than the scenario with 3 out of 3 success (e.g., a 100% success rate). In continuing with the example, in order to give more weights to the number of orders, the model can duplicate each of the observations n times, where n is the corresponding number of orders. For example, similarly, if there has been k successful two-day deliveries out of these n, then the model can attach 1 as a response to each of the k out of these n case, and can attached 0 to the other (n-k) cases.

In some embodiments, threshold tuning can include a process using each of the 4 LightGBM models, each with its own predictions, and each with its own precision-recall (P-R) curves. In several embodiments, aggregating the 4 probabilities with appropriate weights into one index can be performed. In various embodiments, on top of the aggregated index, identifying an optimal threshold can include maximizing the recall when precision exceeds a certain value, such as 95%.

In some embodiments, identification of the weights as well as the threshold can be conducted using a multivariate multi-objective optimization exercise performed on the Training Data. In several embodiments, a set of all feasible points can be obtained from the training data. In some embodiments, the system can use a optimization algorithm with one or more input variables, which goes into the optimization function as a parameter, to evaluate one or more objective functions (also known as loss function or cost function), and return the corresponding values of the objective functions thus computed. In this example, the system deals with a total of 5 parameters, 1 each as the weight for each of the 4 LightGBM probabilities, and 1 more for the threshold. The method then computes 3 loss functions, binary log-loss, average precision, and recall at 95% precision. In such a case, a multivariate multi-objective optimization boils down to an optimization exercise with 5 variables (or parameters) and 3 objective functions.

In various embodiments, an optimum set of recommendations or classifications can be obtained using a Bayesian Model Combination. In a number of embodiments, the Bayesian Model Combination can be performed both for the full data level (e.g., overall level) to maximize the precision and recall overall, as well as at a seller level (e.g., individual level) to check for maximization of precision and recall at a seller level. In some embodiments, with these two sets of recommendations (e.g., classifications) in place for each node, another instance of Bayesian Model Combination can be implemented to obtain a robust optimizer level.

In various embodiments, method 500 further can include a block 545 of obtaining an overall result based on the cumulative LightGBM models, optimizing by the loss functions, assigning weights, and the threshold tuning. For example, for every group (e.g., Seller A, Item 001, SubRegion AB1), the overall result can be a prediction (e.g., a probability score) of whether or not orders pertaining to the respective groups (e.g., nodes) can be delivered within a predetermined time window, such as 2 business days.

In various embodiments, in order to run the predictions for the full data, the model first obtains the list of all groups (e.g., nodes). In some embodiments, obtaining the list of all groups can include several types of conditions, cases, and/or scenarios. In several embodiments, seller-item-subregion combinations (e.g., a node) can be encountered in the modelling phase. In various embodiments, obtaining a node with a seller-item-subregion can be used in the model as the model has already encountered the group. In several embodiments, a seller-item combination can be encountered in the modelling phase, but not for all subregions. In some embodiments, the seller-item combination in this scenario is also covered by the model. In various embodiments, for the cases where the subregion is not encountered, all other features apart from the group features can be used to obtain the recommendations. In some embodiments, when an item is not encountered in the modelling phase, the model can also cover this scenario. In many embodiments, for any unseen item, the model can use the item features already in place. In some embodiments, apart from the group features, all other features can be used to obtain the recommendations. In various embodiments, when a seller is not encountered in the modelling phase and even though the seller includes features for a new partner, the model cannot cover this scenario, instead it can be advisable not to use the model for such predictions as the recommendations can be less than robust compared to other model predictions.

In several embodiments, method 500 can include a block 546 of getting a final recommendation. In some embodiments, once the model obtains predictions from each of the 4 GBMs, the model can use the optimal parameters from the Bayesian Model Combination to obtain the final recommendation for each group. In various embodiments, the model can store the overall results. For example, recommendations received that represent the overall group of partners can be saved in a database until accessed for further use. In several embodiments, each run of the model can be identified by a job_id accompanied by a start_date, which can be basically the date up to which the current set of data can be considered for the corresponding run.

In some embodiments, method 500 can include a block 547 of performing the result obtained in block 545.

In many embodiments, method 500 can include a second submodel of the machine learning model that can determine, at a partner (e.g., a single node) level, a seller level probability score on whether to tag an item corresponding to a nodes as deliverable within in a predetermined time window. In FIG. 5, the second submodel is shown in blocks 550-555 and 560-566. In some embodiments, method 500 can include a block 550 of predicting recommendation table using the data prepared using block 502 and block 503.

In some embodiments, method 500 also can include a block 551 of training data.

In several embodiments method 500 additionally can include a block 552 of selecting prediction features for use in the second submodel of the machine learning model. In some embodiments, data preparation where the data received can be at the order level. In some embodiments, data preparation can include a features creation and selection process where a number of rolling numerical features can be created over a rolling period of time. In various embodiments, category labels of items, by using a CatBoost algorithm, can be intelligently converted into numerical features. For example, data preparation can include generating 500 rolling numerical features where a rolling period can include 30 days and used 7 days to create the features. In some embodiments, features creation and selections can include grouping features based on categorical columns and creating multiple aggregations (e.g., Sum, Mean) for different numerical features.

In many embodiments, method 500 further can include a block 553 of predicting a left frame that refers to running a CatBoost model at an individual seller level, hence distributed frameworks like Spark can be used to implement the same. To streamline the enablement of the same, the corresponding prediction features can be pre-computed, so that the prediction can happen simultaneously, right after the model training. One difference to the training and prediction data is that, for the training data the response is previously known, which is unknown for the prediction data (because the response is to be predicted by the model). The system can uses the features for the prediction data, which includes the left part of the data, whereas the response, or the right part is missing and to be predicted.

In various embodiments, method 500 also can include a block 554 of joining prediction features. In some embodiments, the training data and the prediction data, for each seller is concatenated to obtain a joined data, which can include the exhaustive data for each seller. Additionally, to introduce some noise into the model, a certain relative percentage of data selected randomly from all other sellers taken together also can be added to the data of each seller, as a random noise, which can help in robustness of each of the individual models.

In some embodiments, method 500 further can include block 555 of processing the data and features using the split and cleaning feature. In various embodiments, preparing the data for individual partner-level models also can use a train test split technique. In some embodiments, the train test split can involve diving the data on random split into 3 parts, such as training data (60%), validation data (20%), and a holdout sample (20%). In several embodiments, after the data was divided into the random split into 3 parts, the training data is the data used to build the model, whereas the validation data is used to evaluate the model. In many embodiments, the model can be continued to be tuned until its performance on the validation set is improved.

In various embodiments, method 500 also can include a block 560 of performing modeling algorithm 1 for an individual recommendation using a CatBoost model. In some embodiments, the model can create an individual model for each seller. For example, the model can use Spark. In several embodiments, the model can use a CatBoost classification for each seller to create the individual models. In various embodiments, creating the individual models for each seller can be performed in a parallelized manner so that, each model can run on a different machine. For example, the model can use the PandasUDF functionality introduced in Spark 2.4.

In several embodiments, some adjustments can be made for scaling up the processes. For example, some sellers can be large with large amount of data to process. In such a case, a single node can be not enough to process the whole training data. In some embodiments, when the single node is not enough to process the whole training data, sampling the training data can be performed before passing the data on to the model.

In several embodiments, method 500 additionally can include a block 561 of performing modeling algorithm 2 using the output of modeling algorithm 1 as input. In many embodiments, the training data can be sampled, but not the prediction data, as the model can generate all predictions for the submodels and the machine learning model. In several embodiments, some sellers can generate a large number of predictions. In various embodiments, a salting approach of running the same seller model on multiple nodes but with a different prediction dataframe can be performed, as follows: (1) the partner train data can be replicated into multiple different Partner IDs; (2) the prediction data can be split across these multiple Partner IDs; and/or (3) each of the Partner ID results can be processed in a different node.

In some embodiments, method 500 also can include a block 565 of generating a recommendation for an individual seller on whether to add a tag to the node as a deliverable within a time window. In several embodiments, an individual partner-level model can used rolling features run by a distributed processing system used for large data workloads. For example, such a distributed processing system can include Spark where the rolling features can be processed using the stages in Spark such as data preparation, train test split and seller level modelling.

In a number of embodiment, method 500 can also include a block 566 of writing the recommendation for the second subsystem of the machine learning model.

In many embodiments, generating the recommendation for the individual seller can include, such grouping by categorical columns can be as shown in the Algorithm 1 below:

---

ALGORITHM 1

---

```
gby_s = ['prtnr_id', 'sub_region_id', 'state', 'RPT_LVL_0_NM',
'RPT_LVL_1_NM', 'RPT_LVL_2_NM', 'RPT_LVL_3_NM',
'RPT_LVL_4_NM',
'BRAND_NM', 'region_name', 'prtnr_region_item']
agg_cols = ['plcd_units', 'gmv_plcd_amt', 'net_sales_plcd_amt',
'item_price_amt',
'pkg_wt_oz_qty', 'two_biz_day_ind', 'Shipping_Type_USPS',
'Shipping_Type_USPS','SHIPPING_TYPE_Lasership']
aggregations = ['mean','sum']
fvars = [ ]
for gby in gby_s:
    for col in agg_cols:
        for aggr in aggregations:
            fvars.append([gby,col,aggr])
```

---

In several embodiments, features creation and selections can use normal features, such as the example shown below:

---

```
ohe_categorical = ['prtnr_id', 'RPT_LVL_0_NM',
'RPT_LVL_1_NM', 'region_name',
'prtnrid_courier_preferred_7d', 'prtnrid_courier_preferred_30d']
categorical_cols = ['GTIN', 'sub_region_id', 'state',
```

-continued

'RPT_LVL_2_NM', 'RPT_LVL_3_NM',
'RPT_LVL_4_NM', 'BRAND_NM']

In several embodiments, method 500 can include evaluating the aggregated light gradient boosting models on an overall level to determine whether or not to un-tag or re-tag an item corresponding to one or more nodes as deliverable within in a predetermined time window. In some embodiments, method 500 can include a block 580 of adding (e.g., re-tagging) an item that was un-tagged based on an increased delivery performance received for the one or more nodes for the item and block 581 of deleting (e.g., untagging) an item.

In many embodiments, block 580 also can involve running heuristics to add and/or re-tag a node that was previously recommended to be untagged by an earlier recommendation during a previous time period based on performance metrics of the node. In some embodiments, block 580 can be implemented as shown in method 700 (FIG. 7), described below.

In several embodiments, block 581 further can involve running heuristics to delete and/or remove a tag previously recommended during a previous time period based on performance metrics of the node. In some embodiments, block 581 can be implemented as shown in method 600 (FIG. 6), described below.

Managing the 2-Day Tags on behalf of a partner can present logistic challenges. Because the partners can bear the indirect consequences (e.g., penalized) for a drop in the OTD values, the tags can include being regularly checked to monitor that the OTD of the seller does not fall below a predetermined threshold. When such a scenario is identified, the logistics of immediately pulling back nodes from the 2-day shipping program can involve processing thousands for entries to tag, un-tag, and/or re-tag each node in the online platform over a time period, such as every 5 days, or twice a month, and/or another time period. Further, all un-tagged nodes can be monitored regularly, so that the nodes can be re-tagged once their OTD starts to improve again.

In some embodiments, method 500 also can include a block 585 of creating a tracking record of the node tagged as a deliverable within a time window. In many embodiments, block 585 can process OTD delivery data for each of block 580 and block 581.

In several embodiments, method 500 further can include a block of 586 of recommending to re-tag the node as a deliverable within a time window based on the output of the block 585 monitoring the OTD delivery metrics for the item.

In various embodiments, method 500 also can include a block 587 of recommending to un-tag the node as a deliverable within a time window based on the output of the block 585 monitoring the OTD delivery metrics for the item.

In several embodiments, method 500 additionally can include a block 590 of receiving one or more outputs from one or more submodels of the machine learning model and/or evaluation data from the heuristic model.

In various embodiments, the job_id can be consistent across the three tables such as tables to add from machine learning, to un-tag, and to re-tag. As an example, the heuristic model can be performed as follows:
    a. In the first run of the machine learning (ML) recommendation (job_id=1), the output can indicate that un-tagging is not to be performed and re-tagging is not to be performed.

b. In the 2nd run of the ML recommendation (job_id=2), the output can indicate that un-tagging is to be performed from the list of ML-tagged recommendations from job_id 1. Since this list can be implemented along with the ML recommendations from job_id 2, this also gets assigned to job_id=2, where re-tagging is not to be performed.
    c. In the 3rd run of the ML recommendation (job_id=3), the output can indicate that un-tagging from the list of ML-tagged recommendations from job_id 2 as well as job_id 1. Because this list can be implemented along with the ML recommendations from job_id 3, this also gets assigned to job_id=3, which in this case indicates that re-tagging is to be performed from the list of untagged recommendations from job_id 2. Since this list can be implemented along with the ML recommendations from job_id 3, this also can get assigned to job_id=3.
    d. In various embodiments, a given job_id can yield all the ML recommendations, un-tagged recommendations from previous runs, re-tagged recommendations from previous untagged recommendations that can be implemented together.

In some embodiments, integrating the classifications from the two submodels can provide benefits to using the automated delivery tag system. In various embodiments, the first submodel can include 3-month lagged features where the second submodel can include 7-days and 30-days lagged feature. While the first submodel can have a better performance over the depth of a seller, the second submodel can have a better performance over the breadth of the seller base. For example, the first submodel can have a higher average predicted recall for those sellers, whose predicted precision can be greater than or exceed 95%. The second submodel can have a higher number of sellers, whose predicted precision can be greater than or exceed 95%. In such a scenario, integrating the recommendations of both submodels can build a better machine learning model.

For example, the recommendations from both the models can be used for this example, as follows:
    The first submodel includes recommendations as: [Node 1, Node 2, Node 4, Node 8]
    The second submodel includes recommendations as: [Node 1, Node 2, Node 5, Node 6, Node 7]
    Then, the final set of recommendations from the integrated model can include: [Node 1, Node 2, Node 4, Node 5, Node 6, Node 7, Node 8].

For tracking purposes, the system can maintain the identity of each of the recommendations that correspond to each submodel for further analysis to improve the integration effort.

In various embodiments, block 590 further can include consumption of the recommendations for the node by the seller. In some embodiments, generating the 3 sets of recommendations can include waiting for the seller to implement the recommendation, such as a 2-Day Shipping Tags on the node in the online catalog, so that it can show up on the website. Once the nodes are generated by the ML algorithm, the same can be communicated to the online platform, such as using an internal tool called Atom. The generated nodes can be reformatted as per a fixed template (consumable by Atom), communicated to the Atom moderators via email, who use Atom to make the generated nodes be reflected in the online platform (e.g., website), so as the customers can identify the same and make a purchase decision.

In many embodiments, the recommendation stored in a file can be like a snapshot in time. In various embodiments, the nodes mentioned in the file can be tagged. In several embodiments, if a previously tagged node, can be not added in any of the following runs, the node can be automatically untagged. For example, during the un-tag runs that can be scheduled at an interval of 5 days, where only un-tag nodes are recommended, it can be incremental in nature. So, while creating the recommendation file, three events can be performed simultaneously, including:

All historical tag recommendations can be in place (nodes in Set 1).

All historical un-tag recommendations can be removed from the nodes in Set 1 (nodes in Set 2).

All historical re-tag recommendations can be added to the nodes in Set 2 (nodes in Set 3). Thus, in this example, nodes in Set 3, makes up the recommendation list uploaded, for example as per the Atom template.

In a number of embodiments, every set of un-tagged recommendations obtained, can be monitored during all subsequent runs to check whether its OTD is on the rise and at par with acceptable standards. In several embodiments, once the model metrics for an item, as monitored, are satisfactorily high, these un-tagged recommendations can be re-tagged as a deliverable within a time window, such as 2-dayShipping, as a part of the ongoing run. In some embodiments, a logic used in re-tagging an item as a deliverable for a time window also can be heuristic, as is further described in method 600, below.

Figure 6:
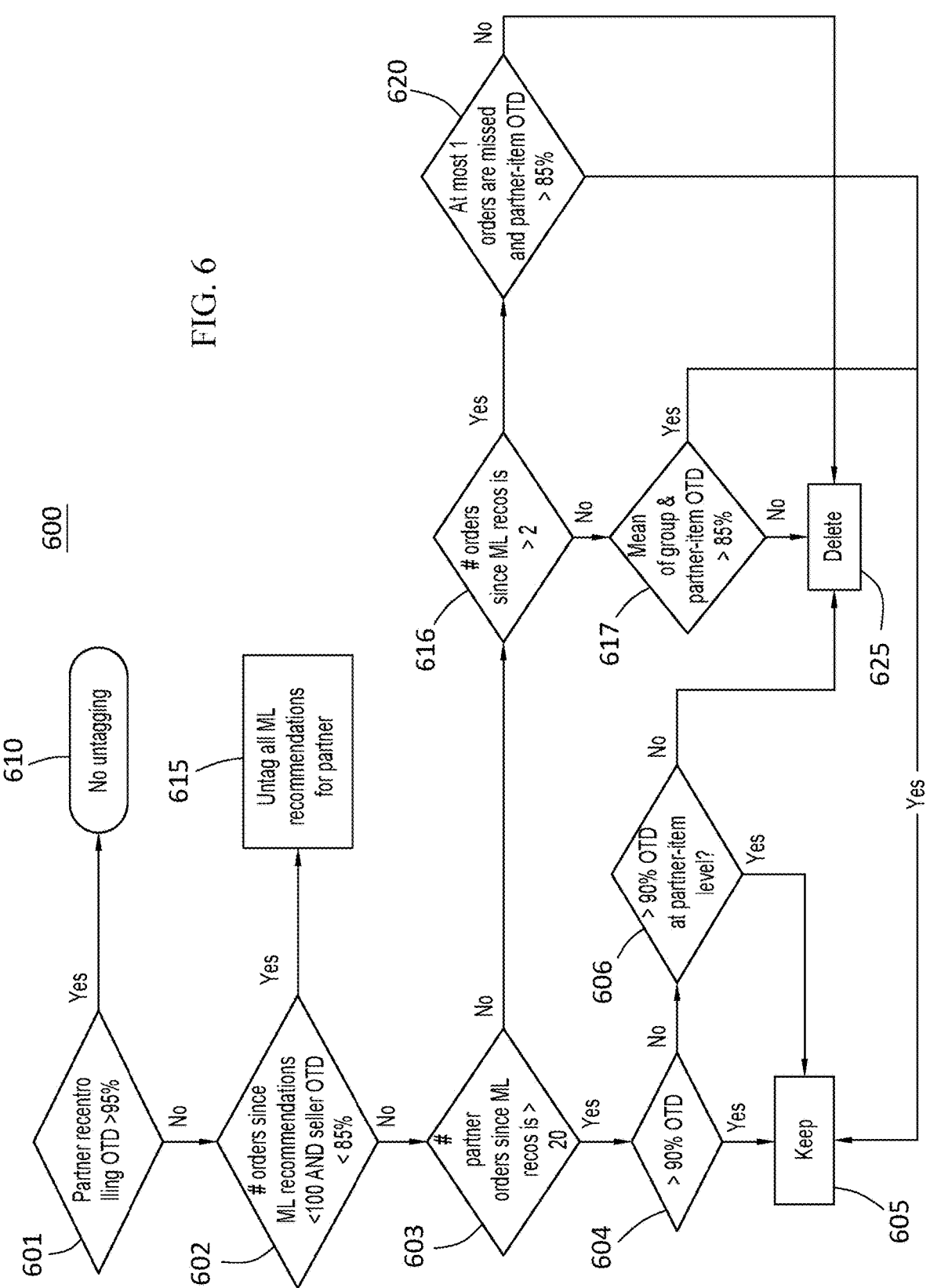
FIG. 6 illustrates a flow chart of a method of determining when to un-tag a node, according to an embodiment.

Turning ahead in the drawings, FIG. 6 illustrates a flow chart for a method 600 of determining when to un-tag a node, according to an embodiment. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In a number of embodiments, machine learning model recommendations that is obtained can be monitored during subsequent runs to check whether the corresponding nodes fall below a predetermined OTD threshold. In some embodiments, when corresponding nodes call below a predetermined OTD threshold, recommendations can be immediately un-tagged and can be implemented as a part of the ongoing run. In several embodiments, a logic used in un-tagging a deliverable option within a time window can be heuristic. For example, since the OTD can be computed at a partner level, the model takes into consideration those partners in the domain of the analysis with an OTD below a predicted precision of 93%. In following with this example, in such a case, for every recommended node corresponding to these partners, which have received at-least one order since the day the respective recommendation was made, the model can use the following heuristics for un-tagging a recommendation, as described below in connection with method 600, and for re-tagging a recommendation, as described below in connection with method 700.

In various embodiments, method 600 can include a decision 601 of determining whether or not a partner recent rolling OTD exceeds a predicted precision threshold for OTD (e.g., approximately 95%). If decision 601 is yes, method 600 can proceed to a block 610 of no un-tagging. Otherwise, decision 601 is no, method 600 can proceed to a decision 602 of determining whether or not (i) a number of orders monitored subsequent to the model recommendations are less than a threshold (e.g., approximately 100) and (ii) a predicted precision metric for a partner OTD is less than a threshold (e.g., approximately 85%). If decision 602 is yes, method 600 can proceed to a block 615 of automatically un-tagging all machine learning model recommendations for a partner. Otherwise, if decision 602 is no, method 600 can proceed to a decision 603 of determining whether or not partner orders monitored subsequent to the machine learning model recommendations are greater than a threshold number of order (e.g., approximately 20 orders). If decision 603 is no, method 600 can proceed to a decision 616, as described further below. Otherwise, if decision 603 is yes, method 600 can proceed to a decision 604 of determining whether or not a predicted precision for OTD greater than a threshold (e.g., approximately 90%) for the partner orders. If decision 604 is yes, method 600 can proceed to a block 605 of keeping the recommendation. Otherwise, decision 604 is no, method 600 can proceed to a decision 606 of determining whether or not a predicted precision for a partner-item level OTD is greater than a threshold (e.g., approximately 90%). If decision 606 is yes, method 600 can proceed to block 605 of keeping the recommendation. If decision 606 is no, method 600 can proceed to a block 625 of deleting the recommendation.

Decision 616 can involve determining whether or not a number of orders subsequent to the machine learning model recommendations is greater than 2 orders. If decision 601 is yes, method 600 can proceed to a decision 620 of determining whether or not, at most 1 order is missed and a predicted precision for a partner-item OTD is greater than a threshold (e.g., approximately 85%). Otherwise, if decision 620 is no, method 600 can proceed to block 625 of deleting the recommendation. If decision 620 is yes, method 600 can proceed to block 605 of keeping the recommendation. If decision 616 is no, method 600 can proceed to a decision 617 of determining whether or not a mean of a group (e.g., a node) and a partner-item OTD has a predicted precision OTD greater than a threshold (e.g., approximately 85%). If decision 617 is no, method 600 can proceed to block 625 of deleting the recommendation. Otherwise, if decision 617 is yes, method 600 can proceed to block 605 of keeping the recommendation.

Figure 7:
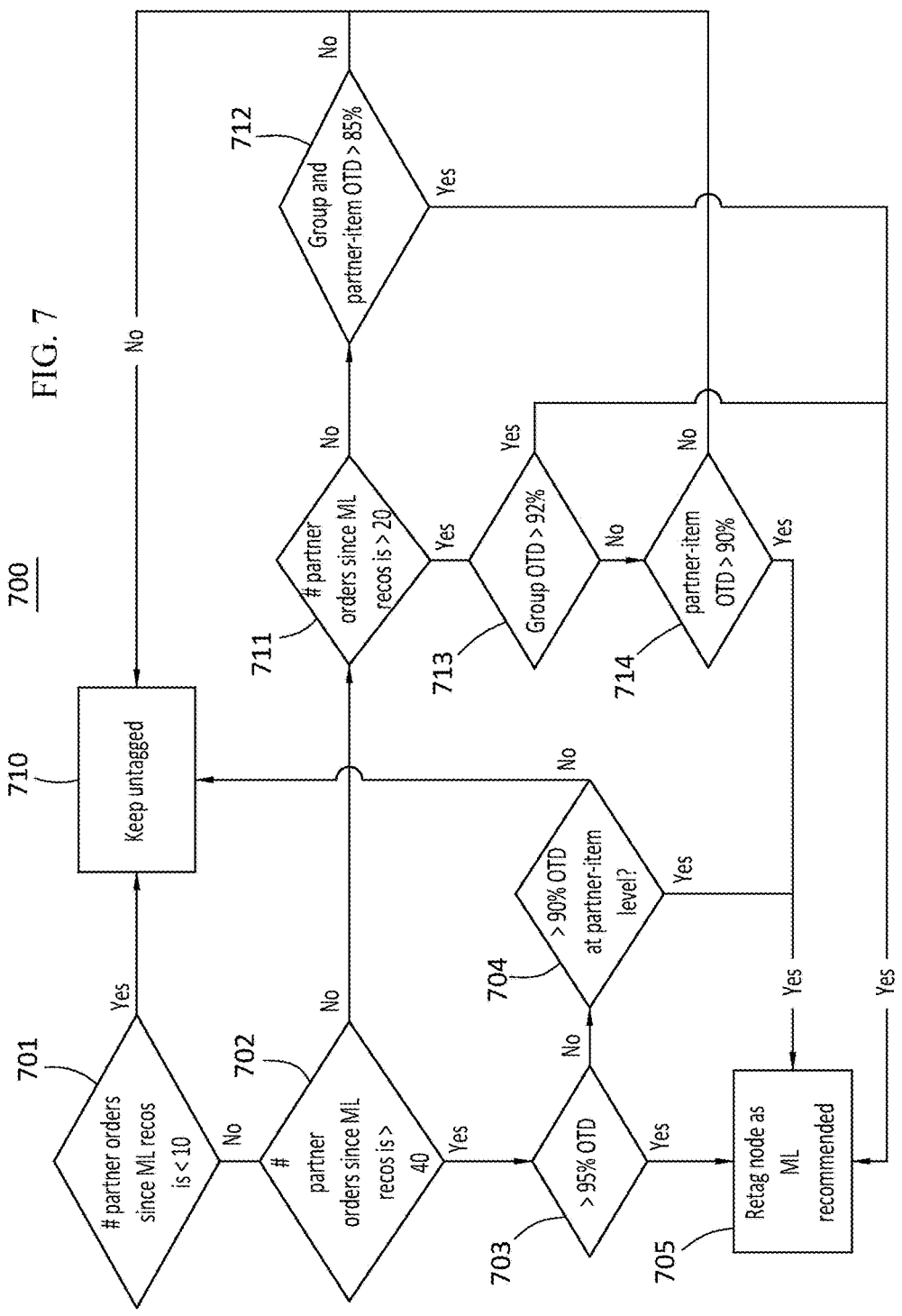
FIG. 7 illustrates a flow chart of a method of determining when to re-tag a node, according to an embodiment.

Turning ahead in the drawings, FIG. 7 illustrates a flow chart of a method 700 of determining when to re-tag a node, according to an embodiment. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of 700 can be performed in any suitable order. In still other embodiments, one or more of the procedures, the processes, and/or the activities of method 700 can be combined or skipped.

Referring to the drawings, FIG. 7 can include a decision 701 of determining whether or not a number of partner orders monitored subsequent to the machine learning model recommendations over a predetermined period of time is less than a threshold (e.g., approximately 10). If decision 701 is yes, method 700 can proceed to a block 710 of keeping the node untagged. Otherwise, if decision 701 is no, method 700 can proceed to decision 702 of determining whether or not the partner orders monitored subsequent to the machine learning model recommendation is greater than a threshold (e.g., approximately 40). If decision 702 is yes, method 700 can proceed to decision 703 of determining whether or not the predicted precision OTD is greater than a threshold (e.g., approximately 95%). If decision 703 is yes, method 700 can proceed to block 705 of re-tagging the node as machine learning recommended. Otherwise, if decision 703 is no, method 700 can proceed to decision 704 of determining whether or not a predicted precision at a partner-item level OTD exceeds a threshold (e.g., approximately 90%). If decision 704 is yes, method 700 can proceed to block 705 of re-tagging the node as machine learning recommended. Otherwise, if decision 704 is no, method 700 can proceed to block 710 of keeping the node untagged.

If decision 702 is no, method 700 can proceed to decision 711 of determining whether or not a number of partner orders subsequent to the machine learning model recommendation is less than a threshold (e.g., approximately 20). If decision 711 is no, method 700 can proceed to decision 712 of determining whether or not the combination metrics of group and partner-item prediction precision OTD is greater than a threshold (e.g., approximately 85%). If decision 712 is yes, method 700 can proceed to block 705 of re-tagging the node as machine learning recommended. Otherwise, if decision 712 is no, method 700 can proceed to block 710 of keeping the node untagged.

If decision 711 is yes, method 700 can proceed to decision 713 of determining whether or not a predicted precision group OTD is greater than a threshold (e.g., approximately 92%). If decision 713 is yes, method 700 can proceed to block 705 of re-tagging the node as machine learning recommended. Otherwise, if decision 713 is no, method 700 can proceed to a decision 714 of determining whether or not the partner-item predicted precision OTD is greater than a threshold (e.g., approximately 90%). If decision 714 is yes, method 700 can proceed to block 705 of re-tagging the node as machine learning recommended. Otherwise, if decision 714 is no, method 700 can proceed to block 710 of keeping the node untagged.

Turning back in the drawings, FIG. 4 illustrates a flow chart for a method 400, according to another embodiment. In many embodiments, method 400 can be a method of automatically tagging a node corresponding to an item can be implemented based on a machine learning model to assign a respective classification to an item in the online platform. In some embodiments, method 400 further can be a method of automatically tagging a node corresponding to an item in an online platform as deliverable within a time window. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as delivery tag system 310 and/or web server 320. The processor(s) can be similar or identical to the processor(s) described above with respect to computer system 100 (FIG. 1).

Referring to FIG. 4, method 400 can include a block 410 of receiving historical delivery records over a predetermined time period from partners associated with items offered to subregions through an online platform. Block 410 can be similar or identical to the activities described in blocks 501-504 (FIG. 5).

In various embodiments, method 400 also can include a block 415 of generating nodes for combinations each comprising a respective one of the partners, a respective one of the items offered by the partners, and a respective one of the subregions. Block 415 can be similar or identical to the activities described in blocks 520, 521, 550-554, and/or 555 (FIG. 5).

In some embodiments, method 400 optionally can include a block 420 of training the first submodel of the machine learning model using features from a first portion of the historical delivery records and responses from a second portion of the historical delivery records. In various embodiments, the features can include partner features, item features, region features, and group features. Block 420 can be similar or identical to the activities described in blocks 530-533, 535, 540 and/or 541 (FIG. 5).

In many embodiments, block 420 of training the first submodel further can include creating a cumulative addition of light gradient boosting models using the features, such as described above in connection with blocks 530-533, and/or 535 (FIG. 5). In several embodiments, block 420 additionally can include training each of the light gradient boosting models to reduce binary log loss, improve precision scores, and improve recall scores, such as described above in connection with blocks 530-533 and/or 535 (FIG. 5). In various embodiments, block 420 also can include determining (i) weights for aggregation with probabilities from the light gradient boosting models and (ii) a tuned threshold, using a Bayesian Model Combination, such as described above in connection with blocks 530-533 and/or 535 (FIG. 5). In some embodiments, determining the weights and the tuned threshold using a Bayesian Model Combination can be performed at a per-seller level and at a full-data level, such as described above in connection with blocks 530-533 and/or 535 (FIG. 5). In some embodiments, block 420 of training the first submodel further can include using a second instance of the Bayesian Model Combination on the weights and the tuned threshold to combine the per-seller level and the full-data level, such as described above in connection with blocks 530-533 and/or 535 (FIG. 5).

In several embodiments, method 400 further optionally can include a block 425 of training the second submodel of the machine learning model using numerical features from the historical delivery records across a first rolling time period and a second rolling time period. Block 425 can be similar or identical to the activities described in blocks 560 and/or 561 (FIG. 5).

In a number of embodiments, the second submodel can include training a respective CatBoost model for each of the partners using the numerical features, as described above in connection with blocks 550-553, 560, and/or 561 (FIG. 5). In various embodiments, block 425 of training the second submodel further can include determining a respective threshold for the respective CatBoost model corresponding to each partner based on a respective second probability score for the each node of the nodes, such as described above in connection with blocks 550-553, 560, and/or 561 (FIG. 5).

In many embodiments, method 400 additionally can include a block 430 of generating, using a machine learning model, a respective classification for each respective node on whether to tag the each respective node as deliverable in a predetermined time window. The respective classification can include a union of a respective output of a first submodel of the machine learning model and a respective output of a second submodel of the machine learning model. Block 430 can be similar or identical to the activities described in blocks 530-535, 546, 547, 560-565, and/or 590 (FIG. 5).

In some embodiments, block 430 of generating the respective classification further can include generating a respective probability score for each of the light gradient boosting models for the each respective node, such as described above in connection with blocks 530-533 (FIG. 5). In many embodiments, block 430 of generating the respective classification additionally can include generating the respective output of the first submodel by applying the weights, as determined, to the respective probability scores to generate an aggregate probability that is compared against the tuned threshold, such as described above in connection with blocks 535, 540, and/or 541 (FIG. 5).

In several embodiments, block 430 of generating the respective classification also can include generating the respective output of the second submodel based upon the respective threshold, such as described above in connection with blocks 550-553, 560, and/or 561 (FIG. 5).

In several embodiments, method 400 further can include a block 435 of, based on the respective classification for the each respective node, automatically tagging a portion of the nodes as deliverable in the predetermined time window in the online platform. Block 435 can be similar or identical to the activities described in blocks 547 and/or 590 (FIG. 5).

In various embodiments, method 400 can optionally and additionally include a block 440 of monitoring a respective on-time-delivery (OTD) performance of the nodes over a subsequent time period after the portion of the nodes were tagged as deliverable in the predetermined time window. Block 440 can be similar or identical to the at least some of the activities described in FIGS. 6 and 7.

In a number of embodiments, method 400 can optionally and additionally include a block 445 of automatically un-tagging a first node of the nodes when the respective OTD performance for the first node falls below one or more predetermined un-tagging thresholds. Block 445 can be similar or identical to at least some of the activities described in 580-586 and/or 587 (FIG. 5) and/or FIG. 6.

In various embodiments, method 400 optionally and additionally can include a block 450 of automatically re-tagging a second node of the nodes as the deliverable in the predetermined time window when the OTD performance exceeds one or more predetermined re-tagging thresholds. Block 450 can be similar or identical to at least some of the activities described in 580-586 and/or 587 (FIG. 5) FIG. 7.

Turning back to the drawings, FIG. 3 illustrates a block diagram of delivery tag system 310. Delivery tag system 310 is merely exemplary and is not limited to the embodiments presented herein. Delivery tag system 310 can be employed in many different embodiments or examples not specifically depicted or described herein. In some embodiments, certain elements or systems of delivery tag system 310 can perform various procedures, processes, and/or acts. In other embodiments, the procedures, processes, and/or acts can be performed by other suitable elements or systems. In many embodiments, the systems of delivery tag system 310 can be modules of computing instructions (e.g., software modules) stored at non-transitory computer readable media. In other embodiments, the systems of delivery tag system 310 can be implemented in hardware.

In many embodiments, training system 311 can at least partially perform block 420 (FIG. 4) of training the first submodel of the machine learning model using features from a first portion of the historical delivery records and responses from a second portion of the historical delivery records, block 425 (FIG. 4) of training the second submodel of the machine learning model using numerical features from the historical delivery records across a first rolling time period and a second rolling time period, block 501 (FIG. 5) of data preparation, block 502 (FIG. 5) of creating the data for a 3-month period starting 6 months prior to a current day of the predetermined time period, block 503 (FIG. 5) of creating the data for the latest 3-month period of the 6 months; block 504 (FIG. 5) of separating a set of nodes not used (e.g., ignored) as part of the data over the time period; block 530 (FIG. 5) of performing a first LightGBM, block 531 (FIG. 5) of performing a second LightGBM, block 532 (FIG. 5) of performing a third LightGBM, block 533 (FIG. 5) of performing a fourth LightGBM, block 535 (FIG. 5) of obtaining a cut-off of the aggregated GBM models, block 540 (FIG. 5) of optimizing the full data or overall data; block 541 (FIG. 5) of optimizing each partner or seller using the per-seller data for the item, block 550 (FIG. 5) of predicting recommendation table, block 551 (FIG. 5) of training data, block 552 (FIG. 5) of selecting prediction features for use in the second submodel of the machine learning model, block 553 (FIG. 5) of predicting a left frame, block 560 (FIG. 5) of performing modeling algorithm 1 for an individual recommendation using a CatBoost model, and/or block 561 (FIG. 5) of performing modeling algorithm 2 using the output of modeling algorithm 1 as input.

In several embodiments, communication system 312 can at least partially perform block 410 (FIG. 4) of receiving historical delivery records over a predetermined time period from partners associated with items offered to subregions through an online platform, and/or block 566 (FIG. 5) of writing the recommendation for the second subsystem of the machine learning model.

In many embodiments, generating system 313 can at least partially perform block 415 (FIG. 4) of generating nodes for combinations each comprising a respective one of the partners, a respective one of the items offered by the partners, and a respective one of the subregions, block 520 (FIG. 5) of clustering all of the partners or sellers that sell the item over an online platform, block 521 (FIG. 5) of creating input data from the one or more clusters of partners, block 550 (FIG. 5) of predicting recommendation table, block 551 (FIG. 5) of training data, block 552 (FIG. 5) of selecting prediction features for use in the second submodel of the machine learning model, block 553 (FIG. 5) of predicting a left frame, and/or block 560 (FIG. 5) of performing modeling algorithm 1 for an individual recommendation using a CatBoost model.

In some embodiments, machine learning system 314 can at least partially perform block 430 (FIG. 4) of generating, using a machine learning model, a respective classification for each respective node on whether to tag the each respective node as deliverable in a predetermined time window, block 530 (FIG. 5) of performing a first LightGBM, block 531 (FIG. 5) of performing a second LightGBM, block 532 (FIG. 5) of performing a third LightGBM, block 533 (FIG. 5) of performing a fourth LightGBM, block 535 (FIG. 5) of obtaining a cut-off of the aggregated GBM models, block 540 (FIG. 5) of optimizing the full data or overall data; block 541 (FIG. 5) of optimizing each partner or seller using the per-seller data for the item, block 545 (FIG. 5) of obtaining an overall result based on the cumulative GBM model, block 546 (FIG. 5) of getting a final recommendation, block 547 (FIG. 5) of performing the result, block 560 (FIG. 5) of performing modeling algorithm 1 for an individual recommendation using a CatBoost model, and/or block 561 (FIG. 5) of performing modeling algorithm 2 using the output of modeling algorithm 1 as input.

In various embodiments, monitoring system 315 can at least partially perform block 440 (FIG. 4) of monitoring a respective on-time-delivery (OTD) performance of the nodes over a subsequent time period after the portion of the nodes were tagged as deliverable in the predetermined time window, block 580 (FIG. 5) of adding (e.g., re-tagging) an item that was un-tagged based on an increased delivery performance received for the one or more nodes for the item, and/or block 581 (FIG. 5) of deleting (e.g., un-tagging) an item.

In a number of embodiments, tagging system 316 can at least partially perform block 435 (FIG. 4) of automatically tagging a portion of the nodes as deliverable in the predetermined time window in the online platform receiving modifications to at least one of one or more parameters used to generate the staffing demand, block 445 (FIG. 4) of automatically un-tagging a first node of the nodes when the respective OTD performance for the first node falls below one or more predetermined un-tagging thresholds and/or block 450 (FIG. 4) of automatically re-tagging a second node of the nodes as the deliverable in the predetermined time window when the OTD performance exceeds one or more predetermined re-tagging thresholds, block 580 (FIG. 5) of adding (e.g., re-tagging) an item that was un-tagged based on an increased delivery performance received for the one or more nodes for the item, block 581 (FIG. 5) of deleting (e.g., un-tagging) an item, block 585 (FIG. 5) of creating a tracking record of the node tagged as a deliverable within a time window, block 586 (FIG. 5) of recommending to re-tag the node as a deliverable within a time window based on the output, block 587 (FIG. 5) of recommending to un-tag the node as a deliverable within a time window based on the output, decision 601 (FIG. 6) of determining whether or not a partner recent rolling OTD exceeds a predicted precision threshold for OTD, decision 602 (FIG. 6) of determining whether or not (i) a number of orders monitored subsequent to the model recommendations are less than a threshold (e.g., approximately 100) and (ii) a predicted precision metric for a partner OTD is less than a threshold (e.g., approximately 85%), decision 603 (FIG. 6) of determining whether or not partner orders monitored subsequent to the machine learning model recommendations are greater than a threshold number of order (e.g., approximately 20 orders), decision 604 (FIG. 6) of determining whether or not a predicted precision for OTD greater than a threshold (e.g., approximately 90%) for the partner orders, block 605 (FIG. 6) of keeping the recommendation, decision 606 (FIG. 6) of determining whether or not a predicted precision for a partner-item level OTD is greater than a threshold (e.g., approximately 90%), block 610 (FIG. 6) of no un-tagging, block 615 (FIG. 6) of automatically un-tagging all machine learning model recommendations for a partner, decision 616 (FIG. 6) of determining whether or not a number of orders subsequent to the machine learning model recommendations is greater than 2 orders, decision 617 (FIG. 6) of determining whether or not a mean of a group (e.g., a node) and a partner-item OTD has a predicted precision OTD greater than a threshold (e.g., approximately 85%), decision 620 (FIG. 6) of determining whether or not, at most 1 order is missed and a predicted precision for a partner-item OTD is greater than a threshold (e.g., approximately 85%), block 625 (FIG. 6) of deleting the recommendation, decision 701 (FIG. 7) of determining whether or not a number of partner orders monitored subsequent to the machine learning model recommendations over a predetermined period of time is less than a threshold (e.g., approximately 10), decision 702 (FIG. 7) of determining whether or not the partner orders monitored subsequent to the machine learning model recommendation is greater than a threshold (e.g., approximately 40), decision 703 (FIG. 7) of determining whether or not the predicted precision OTD is greater than a threshold (e.g., approximately 95%), decision 704 (FIG. 7) of determining whether or not a predicted precision at a partner-item level OTD exceeds a threshold (e.g., approximately 90%), block 705 (FIG. 7) of re-tagging the node as machine learning recommended, block 710 (FIG. 7) of keeping the node untagged, decision 711 (FIG. 7) of determining whether or not a number of partner orders subsequent to the machine learning model recommendation is less than a threshold (e.g., approximately 20), decision 712 (FIG. 7) of determining whether or not the combination metrics of group and partner-item prediction precision OTD is greater than a threshold (e.g., approximately 85%), decision 713 (FIG. 7) of determining whether or not a predicted precision group OTD is greater than a threshold (e.g., approximately 92%), and/or decision 714 (FIG. 7) of determining whether or not the partner-item predicted precision OTD is greater than a threshold (e.g., approximately 90%).

In several embodiments, web server 320 can include a webpage system 322. Webpage system 322 can at least partially perform sending instructions to user computers (e.g., 350-351 (FIG. 3)) based on information received from communication system 312.

Generally, if sellers using an online platform, such as system 300, agree to fulfil items within two business days, then system 300 can communicate this to customers with a "2-day delivery" tag on the front-end for enabled stock-keeping units (SKUs). The presence of the 2-day delivery tags leads to better customer NPS (net promoter score) and significant gross merchandise value (GMV) lift for sellers across categories. Additionally, customers can be happier because more of the products they order can be delivered quickly. In turn, sellers can be happier because they sell more orders by communicating this value to customers of a 2-day delivery option. Because not all items that were delivered in two days were tagged with 2-day delivery options, those items can represent missed opportunities for boosted conversion rates costing missed GMV. By using a machine learning-based delivery tagging model to generate a list of "partner, item, subregion" nodes that would be tagged as available for a 2-day deliverable, the system can automatically update the orders on the online platform on a periodic basis. Additionally, the model can be refreshed every fortnight or at another suitable period, uses past data (e.g., the past 6 months) to train the model.

In some embodiments, the techniques described herein can advantageously use two different submodels, the overall level model (LightGBM) and the individual level model (CatBoost). Each submodel captures different patterns of the data, which could have been missed by using only one submodel instead of the two submodels. To illustrate, consider 10 biased coins (equivalent to partners with different proportions of historical two-day delivered orders), which are tossed repeatedly, and the outcomes of the tosses are recorded. Of note, is that not all the coins can be tossed an equal number of times (mimicking the number of orders each partner might receive within the period). The number of Heads represents the number of orders delivered within a 2-day time period, as noted in Table 2.

TABLE 2

| Coin Toss Outcomes | | | | |
|---|---|---|---|---|
| Coin Number | No. of Tosses | No. of Heads | Proportion of Heads | Verdict |
| Coin 1 | 100000 | 75000 | 0.75 | Biased towards Head |
| Coin 2 | 1000000 | 650000 | 0.65 | Biased towards Head |
| Coin 3 | 500000 | 300000 | 0.60 | Biased towards Head |
| Coin 4 | 100000 | 80000 | 0.80 | Biased towards Head |
| Coin 5 | 5000 | 1000 | 0.20 | Biased towards Tail |
| Coin 6 | 5000 | 600 | 0.12 | Biased towards Tail |
| Coin 7 | 100 | 20 | 0.20 | Biased towards Tail |
| Coin 8 | 500 | 400 | 0.80 | Biased towards Head |
| Coin 9 | 100000 | 40000 | 0.40 | Biased towards Tail |
| Coin 10 | 50000 | 25000 | 0.50 | Unbiased |
| Total | 1860600 | 1172020 | 0.63 | Biased towards Head |

In the example, if noted from the above scenario, the overall numbers can indicate more numbers of Heads as compared to Tails. In this outcome, a different pattern imparted by the coins 5, 6, 7, and 9 tend to get washed out by the dominant patterns of coins 1, 2, 3, 4, and 10. Now, had there been an individual verdict for each coin, it could indicate that actually there could be 4 coins biased towards Tail, 5 coins biased towards Head and 1 Unbiased coin. This example illustrates the advantage of using the two submodels to cover both the depth as well as the breadth of the partner base.

In many embodiments, once the recommendations from both the submodels are obtained, the recommendations are integrated using union. The LightGBM-based approach covers the depth of a seller, which can provide more partner-level recommendations, but for a comparatively lesser number of partners. The CatBoost based approach covers the breadth of the partners, which can provide recommendations for a larger number of partners, but fewer recommendations per seller. Thus, taking the union of the two sets of recommendations, both the depth as well as the breadth of our seller base can be addressed.

In some embodiments, one of the advantages of using the machine learning-based delivery tagging system can be the overall improvement provided over conventional manual methods. The model can automatically tag orders that are available as a 2-day deliverable even when item in the order was not tagged and/or updated by the seller or a third-party. In the field of online orders over an online platform, sellers often do not tag their inventory making a 2-day tagging journey full of friction in the ways described as follows. It can be difficult for sellers to understand the value of the 2-day deliverable option. Additionally it can be difficult for sellers to identify which items to tag with a 2-day deliverable. Sellers can struggle to balance over-tagging and under-tagging practices. Sellers can be fearful of hurting OTD and a majority of sellers often can opt for under-tagging their products. Sellers often do not have large analytical resources to use at their fingertips. Further, it can be difficult for sellers to tag those items as many sellers can struggle to easily set up assortment rules that cover the SKUs identified as eligible for the 2-day deliverable tag. Additionally, it can be difficult for sellers to maintain relevant tags, as doing so involves repeating this process periodically to maintain the benefits of 2-day deliverable tag and prevent OTD slippage as operations evolve.

Conventionally, 2-day on-boarding can be a manual process that struggles to keep up with the scale of the online catalog. For example, next day delivery programs can experience the same type and severity of these challenges because 2-day tagged items can convert at higher percentages than standard delivered items.

In several embodiments, system 300 can use two sets of threshold optimizations to achieve maximum recall, given a certain pre-defined value of precision can be run: one threshold at a seller level, another threshold at an overall level, which are again combined using Bayesian Model Combination, to obtain the appropriate probability threshold for each seller, which can provide an advantage over the conventional methods.

In a number of embodiments, the technology field of determining accurate predictions of delivery time windows can be performed using a machine-learning model, based on past performance, without control in the supply-chain. For example, in the online platform, the sellers can ship their products via third party carriers to customers using carriers, such as FedEx, UPS, and USPS. Often, retailers do not control the supply-chain, nor over the last-mile delivery. In this scenario, retailer and seller face difficulties to convey to customers a non-conservative expected delivery date and meeting such a delivery date with a 95% success rate. In several embodiments, the techniques described herein can beneficially automatically tag, un-tag, and/or re-tag nodes to address these issues.

In many embodiments, the techniques described herein can provide several technological improvements. In some embodiments, the techniques described herein can provide for automatically tagging an item corresponding to a node as a deliverable item within a delivery time window. In a number of embodiments, the techniques described herein can advantageously provide a consistent user experience by dynamically updating delivery tag data for items in an online platform on a periodic basis using delivery tag system 310. In various embodiments, the techniques described herein can dynamically determine whether to classify an item corresponding to a node as a deliverable items with a 2-day delivery option. For example, over two million product updates can be received from third-party vendors in one day. In some embodiments, the techniques provided herein can beneficially reduce computing resources and costs while continuing to offer real time updates based on the delivery tag system 310 for the items received each second, minute, and/or other suitable period of time in at least a day, a week, and/or other suitable periods of time.

In many embodiments, the techniques described herein can be used continuously at a scale that cannot be handled using manual techniques. For example, the number of daily and/or monthly visits to the online platform can exceed approximately ten million and/or other suitable numbers, the number of registered users to the online platform can exceed approximately one million and/or other suitable numbers, and/or the number of products and/or items sold on the website can exceed approximately ten million (10,000,000) approximately each day.

In a number of embodiments, the techniques described herein can solve a technical problem that arises only within the realm of computer networks, as determining whether to tag an item as a deliverable item using machine learning-based delivery tagging does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because an online platform catalog, such as an online catalog, that can power and/or feed an online website that is part of the techniques described herein would not exist.

Various embodiments can include a system including one or more processors and one or more non-transitory computer-readable media storing computing instructions configured to run on the one or more processors and perform certain acts. The acts can include receiving historical delivery records over a predetermined time period from partners associated with items offered to subregions through an online platform. The acts further can include generating nodes for combinations each comprising a respective one of the partners, a respective one of the items offered by the partners, and a respective one of the subregions. The acts also can include generating, using a machine learning model, a respective classification for each respective node on whether to tag the each respective node as deliverable in a predetermined time window. The respective classification can include a union of a respective output of a first submodel of the machine learning model and a respective output of a second submodel of the machine learning model. The acts additionally can include, based on the respective classification for the each respective node, automatically tagging a portion of the nodes as deliverable in the predetermined time window in the online platform.

A number of embodiments can include a method being implemented via execution of computing instructions configured to run at one or more processors and stored at one or more non-transitory computer-readable media. The method can include receiving historical delivery records over a predetermined time period from partners associated with items offered to subregions through an online platform. The method also can include generating nodes for combinations each comprising a respective one of the partners, a respective one of the items offered by the partners, and a respective one of the subregions. The method further can include generating, using a machine learning model, a respective classification for each respective node on whether to tag the each respective node as deliverable in a predetermined time window. The respective classification can include a union of a respective output of a first submodel of the machine learning model and a respective output of a second submodel of the machine learning model. The method additionally can include, based on the respective classification for the each respective node, automatically tagging a portion of the nodes as deliverable in the predetermined time window in the online platform.

Several embodiments can include a system. The system can include one or more processors; and one or more non-transitory computer-readable media storing computing instructions, that when executed on one or more processors, cause the one or more processors to perform certain operations. The operations can include training a first submodel of a machine learning model by at least (i) creating a cumulative addition of light gradient boosting models, and (ii) determining weights for aggregation with probabilities from the light gradient boosting models. The operations also can include generating, using the machine learning model, as trained, classifications for nodes. The classifications include unions of outputs of the first submodel of the machine learning model and outputs of a second submodel of the machine learning model. Based on the classifications for the nodes, the operations also can include automatically tagging a portion of the nodes as deliverable in an online platform.

Various embodiments can include a method. The method being implemented via execution of computing instructions configured to run on one or more processors and stored at one or more non-transitory computer-readable media. The method can include training a first submodel of a machine learning model by at least (i) creating a cumulative addition of light gradient boosting models, and (ii) determining weights for aggregation with probabilities from the light gradient boosting models. The method also can include generating, using the machine learning model, as trained, classifications for nodes. The classifications include unions of outputs of the first submodel of the machine learning model and outputs of a second submodel of the machine learning model. Based on the classifications for the nodes, the method also can include automatically tagging a portion of the nodes as deliverable in an online platform.

Although automatically tagging a portion of the nodes as deliverable in a predetermined time window has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 4-7 may include different procedures, processes, and/or activities and be performed by many different modules, in many different orders, and/or one or more of the procedures, processes, or activities of FIGS. 4-7 may include one or more of the procedures, processes, or activities of another different one of FIGS. 4-7. As another example, the systems within delivery tag system 310 and/or web server 320 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents

What is claimed is:

1. A system comprising:
   one or more processors; and
   one or more non-transitory computer-readable media storing computing instructions, that when executed on one or more processors, cause the one or more processors to perform operations, the operations comprising:
   receiving historical delivery records over a given time period from partners associated with items offered to subregions;

generating nodes for combinations, each node comprising a respective one of the partners, one of the items offered by at least one of the partners, and a respective one of the subregions;

training a first submodel of a machine learning model by at least (i) creating a cumulative addition of light gradient boosting models using first features from the historical delivery records from all partners over a first time period, wherein the first features comprise at least one or more first partner features, one or more first item features, and one or more first region features, and (ii) determining weights for aggregation with probabilities from the light gradient boosting models;

training a second submodel of the machine learning model using second features from historical delivery records from individual partners over a second time period, wherein the second features comprise at least one or more second partner features, one or more second item features, and one or more second region features;

generating, using the machine learning model, as trained, classifications for nodes, wherein the classifications comprise unions of node classification outputs of the first submodel of the machine learning model and node classification outputs of the second submodel of the machine learning model; and based on the classifications for the nodes, automatically tagging a portion of the nodes as deliverable within a given time window in an online platform.

2. The system of claim 1, wherein training the first submodel of the machine learning model further comprises:

training the light gradient boosting models to (i) reduce binary log loss, (ii) increase precision scores, and (iii) increase recall scores.

3. The system of claim 1, wherein determining the weights further comprises:

determining the weights using a Bayesian Model Combination at a per-seller level and a full-data level.

4. The system of claim 1, wherein generating the classifications further comprises:

generating probability scores for the light gradient boosting models for the nodes.

5. The system of claim 4, wherein generating the classifications further comprises:

generating an output of the first submodel by applying the weights, as determined, to the probability scores to generate an aggregate probability.

6. The system of claim 1, wherein training the second submodel of the machine learning model further comprises using numerical features from historical delivery records across the second time period and a third time period.

7. The system of claim 6, wherein:

training the second submodel further comprises:

training one or more CatBoost models using the numerical features.

8. The system of claim 7, wherein:

training the second submodel further comprises:

determining one or more thresholds for the one or more CatBoost models based on second probability scores for the nodes; and generating the classifications comprises:

generating outputs of the second submodel.

9. The system of claim 1, wherein the operations further comprise:

monitoring on-time-delivery (OTD) performances of the nodes over a subsequent time period after the portion of the nodes was tagged as deliverable in the given time window;

automatically un-tagging a first node of the nodes when an OTD performance for the first node falls below one or more un-tagging thresholds; and automatically re-tagging a second node of the nodes as deliverable in the given time window when an OTD performance for the second node exceeds one or more re-tagging thresholds.

10. A method being implemented via execution of computing instructions configured to run on one or more processors and stored at one or more non-transitory computer-readable media, the method comprising:

receiving historical delivery records over a given time period from partners associated with items offered to subregions;

generating nodes for combinations, each node comprising a respective one of the partners, one of the items offered by at least one of the partners, and a respective one of the subregions;

training a first submodel of a machine learning model by at least (i) creating a cumulative addition of light gradient boosting models using first features from the historical delivery records from all partners over a first time period, wherein the first features comprise at least one or more first partner features, one or more first item features, and one or more first region features, and (ii) determining weights for aggregation with probabilities from the light gradient boosting models;

training a second submodel of the machine learning model using second features from historical delivery records from individual partners over a second time period, wherein the second features comprise at least one or more second partner features, one or more second item features, and one or more second region features;

generating, using the machine learning model, as trained, classifications for nodes, wherein the classifications comprise unions of node classification outputs of the first submodel of the machine learning model and node classification outputs of the second submodel of the machine learning model; and based on the classifications for the nodes, automatically tagging a portion of the nodes as deliverable within a given time window in an online platform.

11. The method of claim 10, wherein training the first submodel of the machine learning model further comprises:

training the light gradient boosting models to (i) reduce binary log loss, (ii) increase precision scores, and (iii) increase recall scores.

12. The method of claim 10, wherein determining the weights further comprises:

determining the weights using a Bayesian Model Combination at a per-seller level and a full-data level.

13. The method of claim 10, wherein generating the classifications further comprises:

generating probability scores for the light gradient boosting models for the nodes.

14. The method of claim 13, wherein generating the classifications further comprises:

generating an output of the first submodel by applying the weights, as determined, to the probability scores to generate an aggregate probability.

15. The method of claim 10, wherein training the second submodel of the machine learning model further comprises using numerical features from historical delivery records across the second time period and a third time period.

16. The method of claim 15, wherein:

training the second submodel further comprises:

training one or more CatBoost models using the numerical features.

17. The method of claim 16, wherein:

training the second submodel further comprises:

determining one or more thresholds for the one or more CatBoost models based on second probability scores for the nodes; and generating the classifications comprises:

generating outputs of the second submodel.

18. The method of claim 10, further comprising:

monitoring on-time-delivery (OTD) performances of the nodes over a subsequent time period after the portion of the nodes was tagged as deliverable in the given time window;

automatically un-tagging a first node of the nodes when an OTD performance for the first node falls below one or more un-tagging thresholds; and automatically re-tagging a second node of the nodes as deliverable in the given time window when an OTD performance for the second node exceeds one or more re-tagging thresholds.

19. The method of claim 10, wherein the training the first submodel of the machine learning model further comprises training, using the one or more first partner features as inputs, a first one of the light gradient boosting models to output a first probability score.

20. The method of claim 19, wherein the training the first submodel of the machine learning model further comprises:

training, using the first probability score of the first one of the light gradient boosting models, the one or more first partner features, and the one or more first item features as inputs, a second one of the light gradient boosting models, to output a second probability score; and aggregating the first and the second probability scores using Bayesian Model Combination.

* * * * *